United States Patent [19]

Waldroup

[11] Patent Number: 5,077,828
[45] Date of Patent: Dec. 31, 1991

[54] RF CHANNEL EXPANSION IN A TRUNKED RADIO COMMUNICATIONS SYSTEM

[75] Inventor: Anthony B. Waldroup, Forest, Va.

[73] Assignee: General Electric Company, Lynchburg, Va.

[21] Appl. No.: 239,581

[22] Filed: Sep. 1, 1988

[51] Int. Cl.$^5$ .......................... H04Q 7/00; H04B 7/02
[52] U.S. Cl. ...................................... 455/34; 455/54; 455/186; 379/63
[58] Field of Search .................. 455/11, 17, 33–34, 455/32, 54, 67, 166, 185–186; 379/58, 63

[56] References Cited

U.S. PATENT DOCUMENTS

| | | | |
|---|---|---|---|
| 3,292,178 | 12/1966 | Magnuski | 455/38 |
| 3,458,664 | 7/1969 | Adlhoch et al. | 379/63 |
| 3,571,519 | 3/1971 | Tsimbidis | 379/63 |
| 3,696,210 | 10/1972 | Peterson et al. | 370/13 |
| 3,764,915 | 10/1973 | Cox et al. | 455/33 |
| 3,898,390 | 8/1975 | Wells et al. | 379/59 |
| 3,906,166 | 9/1975 | Cooper et al. | 379/60 |
| 3,936,616 | 2/1976 | DiGianfilippo | 379/63 |
| 3,970,801 | 7/1976 | Ross et al. | 379/63 |
| 4,001,693 | 1/1977 | Stackhouse et al. | 455/51 |
| 4,010,327 | 3/1977 | Kobrinetz et al. | 379/58 |
| 4,012,597 | 3/1977 | Lynk, Jr. et al. | 455/53 |
| 4,022,973 | 5/1977 | Stackhouse | 375/114 |
| 4,027,243 | 5/1977 | Stackhouse | 375/114 |
| 4,029,901 | 6/1977 | Campbell | 379/58 |

(List continued on next page.)

FOREIGN PATENT DOCUMENTS

WO8701537 3/1987 PCT Int'l Appl. .

OTHER PUBLICATIONS

Federal Information Processing Standards, Pub. No. 46, Data Encryption Standard, US Dept. of Comm, NTIS, (5285 Port Royal Rd., Springfield, VA. 22161.
"Voice and Data Transmission", Arrendondo, Teggeler and Smith, Bell Systems Technology Journal, vol. 58, No. 1, Jan. 1978, pp. 97–122.
"Motorola Announces the Syntor X 9000E Mobile Radio for Smartnet Systems"; Motorola, Inc., Shaumburg, IL 60196; press release of 6 Aug. 1987; and
"Motorola Introduces Smartnet Mostar Mobile Radio for Trunked and Conventional 800 MHz Systems", press release of 27 Jun. 1986.
"AmeriCom's Network Switch", product brochure, Jan. 26, 1988, AmeriCom Corporation, Atlanta, Georgia 30340.
"AmeriCom's Network Supervisor", product brochures, Jan. 26, 1988, AmericCom Corporation, Atlanta, Georgia 30340.

(List continued on next page.)

Primary Examiner—Curtis Kuntz
Assistant Examiner—Andrew Faile
Attorney, Agent, or Firm—Nixon & Vanderhye

[57] ABSTRACT

In a trunked radio frequency communications system, an arrangement dynamically "expands" or extends the frequency allocation table stored within the "personality" defining non-volatile storage device of transceivers to include additional RF channels. A channel configuration control message specifying a logical channel field and an FCC channel number defining an RF channel frequency is periodically transmitted over the active RF digital control channel. Transceivers correctly receiving this channel configuration message extend their stored frequency allocation tables to add the additional channel entry specified by the message. The transceivers reference these additional records in response to call messages and are thus capable of operating on the new channels. Channel configuration messages are periodically repeated at time intervals long enough to ensure the messages have no real adverse impact on control channel loading but short enough to cause transceivers to almost immediately update stored channel information. Errors are prevented from occurring by transmitting the channel configuration message in both slots of an outbound control channel message and requiring receipt of a non-zero site identification control message before processing any channel configuration message.

34 Claims, 10 Drawing Sheets

U.S. PATENT DOCUMENTS

| | | | |
|---|---|---|---|
| 4,128,740 | 12/1978 | Graziano | 455/33 |
| 4,131,849 | 12/1978 | Freeburg et al. | 375/5 |
| 4,152,647 | 5/1979 | Gladden et al. | 455/11 |
| 4,184,118 | 1/1980 | Cannalte et al. | 370/77 |
| 4,231,114 | 10/1980 | Dolikian | 455/49 |
| 4,309,772 | 1/1982 | Kloker et al. | 375/76 |
| 4,312,070 | 1/1982 | Coombes et al. | 371/39.1 |
| 4,312,074 | 1/1982 | Pautler et al. | 375/96 |
| 4,326,264 | 4/1982 | Cohen et al. | 364/900 |
| 4,339,823 | 7/1982 | Predina et al. | 375/20 |
| 4,347,625 | 8/1982 | Williams | 455/17 |
| 4,360,927 | 11/1982 | Bowen et al. | 455/17 |
| 4,392,242 | 7/1983 | Kai | 455/33 |
| 4,400,585 | 8/1983 | Kamen et al. | 379/63 |
| 4,409,687 | 10/1983 | Berti et al. | 455/7 |
| 4,427,980 | 1/1984 | Fennel et al. | 340/825.52 |
| 4,430,742 | 2/1984 | Milleker et al. | 375/5 |
| 4,430,755 | 2/1984 | Nadir et al. | 455/77 |
| 4,433,256 | 2/1984 | Dolikian | 307/358 |
| 4,450,573 | 5/1984 | Noble | 375/104 |
| 4,457,018 | 6/1984 | Takayama | 455/33 |
| 4,485,486 | 11/1984 | Webb et al. | 455/33 |
| 4,517,561 | 5/1985 | Burke et al. | 340/825.07 |
| 4,525,865 | 6/1985 | Meads | 455/186 |
| 4,534,061 | 8/1985 | Ulug | 455/17 |
| 4,553,262 | 11/1985 | Coe | 455/15 |
| 4,573,206 | 2/1986 | Grauel et al. | 455/33 |
| 4,573,209 | 2/1986 | Deman et al. | 455/73 |
| 4,578,815 | 3/1986 | Persinotti | 455/15 |
| 4,594,591 | 6/1986 | Burke | 340/825.07 |
| 4,612,415 | 9/1986 | Zdunek et al. | 455/33 |
| 4,644,347 | 2/1987 | Lucas et al. | 340/825.04 |
| 4,649,567 | 3/1987 | Childress | 455/17 |
| 4,658,435 | 4/1987 | Childress et al. | 455/17 |
| 4,677,653 | 6/1987 | Weiner et al. | 379/58 |
| 4,698,805 | 10/1987 | Sasuta et al. | 455/17 |
| 4,716,407 | 12/1987 | Borras et al. | 340/825.04 |
| 4,734,928 | 3/1988 | Weiner et al. | 379/59 |
| 4,817,190 | 3/1989 | Comroe et al. | 455/17 |
| 4,831,373 | 5/1989 | Hess | 455/17 |
| 4,843,588 | 6/1989 | Flynn | 455/186 |

OTHER PUBLICATIONS

"PAYBACK ANALYSIS", 3 pages, revised 4 June 1987.

Bishop, "AmeriCom-Setting a New SMR Standard", 9 *TeleCarrier*, No. 4, 2 pp., Apr. 1986.

"AmeriCom Network Switching System Feature Description and Release Schedule", revised 1 Mar. 1989, pp. 1-11.

RF CHANNEL EXPANSION IN A TRUNKED RADIO COMMUNICATIONS SYSTEM

CROSS-REFERENCES TO RELATED APPLICATIONS

This application is related to commonly assigned U.S. patent application Ser. No. 07/229,814 filed Aug. 8, 1988 entitled "Dynamic Regrouping In A Trunked Radio Communication System", the entire disclosure of which is hereby incorporated herein by reference.

This application is also somewhat related to the following copending commonly assigned U.S. patent applications:

Application Ser. No. 085,663 now U.S. Pat. No. 4,903,321 filed on Aug. 14, 1987 entitled "Radio Trunking Fault Detection System";

Application Ser. No. 056,922 now U.S. Pat. No. 4,905,302 of Childress et al entitled "Trunked Radio Repeater System" filed June 3, 1987;

Application Ser. No. 057,046 of Childress et al entitled "Failsoft Architecture for Public Trunking System" filed June 3, 1987;

Application Ser. No. 056,924 now U.S. Pat. No. 4,821,292 of Childress entitled "Adaptive Limiter/Detector Which Changes Time Constant Upon Detection of Dotting Pattern" filed June 3, 1987;

Application Ser. No. 056,923 now U.S. Pat. No. 4,905,234 of Childress et al entitled "Apparatus and Method for Transmitting Digital Data Over a Radio Communications Channel" filed June 3, 1987;

Application Ser. No. 085,572 now U.S. Pat. No. 4,835,731 of Nazarenko et al entitled "Processor-to-Processor Communications Protocol for a Public Service Trunking System" filed Aug. 14, 1987;

Application Ser. No. 085,490 now U.S. Pat. No. 4,903,262 of Dissosway et al entitled "Mobile Radio Interface" filed Aug. 14, 1987;

Application Ser. No. 085,491 of Cole et al entitled "A Method for Infrequent Radio Users to Simply Obtain Emergency Assistance" filed Aug. 14, 1987; and Application Ser. No. 181,441 filed Oct. 7, 1987, 1988 entitled "Signalling Protocol for a Trunked Radio Repeater System".

The disclosures of each of those related copending patent applications are incorporated by reference herein.

FIELD OF THE INVENTION

This invention is generally directed to the art of trunked radio repeater systems. It is more particularly directed to a trunked radio repeater system arrangement and method which permits individual and groups of mobile radio units to be dynamically reprogrammed "over the air" to allow communications over new or additional RF channels.

BACKGROUND AND SUMMARY OF THE INVENTION

Radio repeater trunking (time sharing of a single repeater communications channel among many users) is well-known. Early trunking systems used analog control signals while some more recent systems have utilized digital control signals. Control signals have been utilized on a dedicated control channel and/or on different ones of the working channels for various different reasons and effects. A non-exhaustive but somewhat representative sampling of publications and patents describing typical prior art trunked radio repeater systems is identified below:

U.S. Pat. No. 3,898,390, Wells et al (1975)
U.S. Pat. No. 4,392,242, Kai (1983)
U.S. Pat. No. 4,534,061, Ulug (1985)
U.S. Pat. No. 4,649,567, Childress (1987)
U.S. Pat. No. 4,658,435, Childress et al (1987)
U.S. Pat. No. 4,716,407, Borras et al (1987)
JAPAN 61-102836 (A) Ishikawa (May 1986)
U.S. Pat. No. 3,292,178, Magnuski (1966)
U S. Pat. No. 3,458,664, Adlhoch et al (1969)
U.S. Pat. No. 3,571,519, Tsimbidis (1971)
U.S. Pat. No. 3,696,210, Peterson et al (1972)
U.S. Pat. No. 3,906,166, Cooper et al (1975)
U.S. Pat. No. 3,936,616, DiGianfilippo (1976)
U.S. Pat. No. 3,970,801, Ross et al (1976)
U.S. Pat. No. 4,001,693, Stackhouse et al (1977)
U.S. Pat. No. 4,010,327, Kobrinetz et al (1977)
U.S. Pat. No. 4,012,597, Lynk, Jr. et al (1977)
U.S. Pat. No. 4,022,973, Stackhouse et al (1977)
U.S. Pat. No. 4,027,243, Stackhouse et al (1977)
U.S. Pat. No. 4,029,901, Campbell (1977)
U.S. Pat. No. 4,128,740, Graziano (1978)
U.S. Pat. No. 4,131,849, Freeburg et al (1978)
U.S. Pat. No. 4,184,118, Cannalte et al (1980)
U.S. Pat. No. 4,231,114, Dolikian (1980)
U.S. Pat. No. 4,309,772, Kloker et al (1982)
U.S. Pat. No. 4,312,070, Coombes et al (1982)
U.S. Pat. No. 4,312,074, Pautler et al (1982)
U.S. Pat. No. 4,326,264, Cohen et al (1982)
U.S. Pat. No. 4,339,823, Predina et al (1982)
U.S. Pat. No. 4,347,625, Williams (1982)
U.S. Pat. No. 4,360,927, Bowen et al (1982)
U.S. Pat. No. 4,400,585, Kamen et al (1982)
U.S. Pat. No. 4,409,687, Berti et al (1983)
U.S. Pat. No. 4,430,742, Milleker et al (1984)
U.S. Pat. No. 4,430,755, Nadir et al (1984)
U.S. Pat. No. 4,433,256, Dolikian (1984)
U.S. Pat. No. 4,450,573, Noble (1984)
U.S. Pat. No. 4,485,486, Webb et al (1984)
U.S. Pat. No. 4,578,815, Persinotti (1985)

There are many actual and potential applications for trunked radio repeater systems. However, one of the more important applications is for public service trunked (PST) systems. For example, one metropolitan area may advantageously use a single system of trunked radio repeaters to provide efficient radio communications between individual radio units within many different agencies. As is well-known to those familiar with trunking theory, a relatively small number of radio repeaters can efficiently service all of needs of a public service organization within a given geographic area if they are trunked (i.e., shared on an "as-needed" basis between all potential units).

Before modern trunked radio repeater systems were developed, mobile radio transceivers were provided with crystal controlled frequency synthesizers providing a limited number of fixed transmit/receive channels—and the various channels were assigned for use by different "groups" of radio transceivers. Referring to FIG. 1, for example, fixed channels might be assigned as follows:

channel A to police squad A,
channel B to police squad B,
channel C to rescue squad/paramedics,
channel D to snow removal equipment,
channel E to municipal vehicles, channel F to fire squad A, and
channel G to fire squad B.

Every mobile transceiver in a group was capable of communicating with other members of its group (and with a central dispatcher) over its assigned communications channel.

This type of arrangement, although certainly providing private and reliable communications, had some severe disadvantages. One important disadvantage was that some channels were under-utilized while other channels were extremely congested (e.g., during disasters or emergencies requiring coordination between many different users). Moreover, the number of required communications channels and associated RF repeaters was directly proportional to the number of groups supported by the system. As RF channels became more scarce, it was no longer practical in major metropolitan areas to dedicate RF frequencies to only a single group of users and some method of sharing frequencies between multiple user groups was required.

Trunked radio repeater systems rely upon software controlled transceiver frequency control rather than crystal controlled preset operating frequencies. Generally, a certain number of RF communications channels (e.g., 12 or 24 channels per repeater site) are allocated (by governmental authorities) to a communications system. The communications system provides a radio repeater for each of these RF channels, and temporarily assigns these channels on an "as needed" basis for exclusive use by calling mobile units requesting communications and the group(s) of mobile units being called.

This trunked arrangement provides for much additional flexibility. Even though all of these groups are in effect "reusing" the same communications channels in this trunked radio system, the trunking is mostly transparent to individual users. For example, when a police officer in police squad A switches his "channel" (actually group) selector switch to correspond to the first group and actuates his "push-to-talk" microphone switch to make a call, his transceiver and all other active transceivers of police squad A are automatically controlled to switch to a free "working" channel temporarily dedicated to their use—and significantly, no other mobile transceivers are permitted to monitor or participate in the communications over this channel. This privacy feature afforded by trunked communications systems is important for providing each group of users with efficient, reliable communications. Thus, in this respect the trunked system behaves from a user's view point like the prior systems in which each service had a channel dedicated to its exclusive use—while providing the resource (radio spectrum and repeater equipment) economy derived from channel and repeater sharing.

Mobile and portable transceivers are typically preprogrammed in advance at the time of sale by the manufacturer (or equipment distributor) for the specific set of RF frequencies (and other "personality" information) used by a particular system. This programming is typically accomplished by connecting the transceiver to a dedicated programming device and loading a frequency allocation table (and other information) into an internal non-volatile "personality PROM" memory device within the transceiver. See commonly assigned U.S. Pat. No. 4,525,865 to Mears (1985) and copending commonly assigned application Ser. No. 06/910,353 now U.S. Pat. No. 4,843,588 of Flynn et al filed Sept. 22, 1986 for two examples of how this programming may be accomplished.

One of the disadvantages of most prior art transceiver "personality" programming techniques is that they require a hard-wired connection between the transceiver to be programmed and a programming device—and thus require the transceiver to be taken out of service and brought from the field into a central location (e.g., a distributor's repair shop or service depot) for reprogramming. While this type of programming operation is quite practical as part of the testing procedure involved in placing new transceivers into service, it is generally not practical to physically recall hundreds or thousands of transceivers already in service for a particular trunked communications system into a service depot in order to reprogram them to accommodate new system capabilities or the like.

Of course, system designers take great pains to ensure that all improvements, enhancements and additional features added to the system are compatible with existing, earlier versions of transceivers already in the field. Just as black and white television receivers are capable of receiving color television transmissions and displaying those color images in the black and white format, older mobile transceivers must remain fully capable of providing all of the functions they were designed to provide—even when the overall system is "upgraded" to provide additional, more advanced functions. This makes it possible to install new transceivers capable of taking advantage of such upgraded functions without requiring the older transceivers to be overhauled. As is well known, one way to ensure such "upward compatibility" exists is to make the program controlled steps performed by the transceivers themselves as simple and non-limiting as possible, so that system enhancements made by changing the site controller programming can be fully participated in by even the older mobile transceivers. However, there are certain functions the mobile transceivers must perform independently, and these functions cannot generally be changed except by reprogramming each and every mobile transceiver.

One of the functions the mobile transceiver must perform on its own is to scan all possible active frequencies on a system. At the time a transceiver is first turned on, one of the first things it typically does is to "listen" in sequence on each of the RF channels stored in nonvolatile form in its internal frequency allocation table to locate an active digital control channel. Once the control channel is found, the transceiver monitors the channel for call messages. A call message may direct the transceiver to retune to a working channel, but such call messages typically do not explicitly specify the transmit and receive frequencies of the working channel but instead require the transceiver to once again reference its internally stored frequency allocation table to obtain the information its frequency synthesizer requires to retune to the designated working channel.

FIG. 2(A) schematically shows an exemplary configuration of a prior art trunked radio communications system 100 including a mobile transceiver 152 and ten trunked RF repeater stations 300(1)-300(10) operating on logical RF channels 1-10 respectively. Mobile transceiver 152 includes a "personality-defining" non-volatile memory device 152a which stores a frequency allocation table defining logical and physical channel numbers for all ten RF channels. This table is used to control a frequency synthesizer 152b, which in turn controls the transmit and receive frequencies of RF transmitter/receiver section 152c.

Due to the limited nature of frequency spectrum resources, governmental licensing authorities (e.g., the Federal Communications Commission in the United States) are generally very stingy about allocating RF frequencies to those who apply for them. For example, when a trunked radio repeater system is first constructed and installed, only a few RF channels may be allocated to the system. Generally, additional RF channels are granted only on an "actual need" basis after the system has matured and it can be shown that the additional channels are actually required to accommodate system traffic. While this policy of granting channels based on actual need prevents channels from being wasted, it causes a fundamental problem in prior art trunked communications systems architectures as is demonstrated by FIG. 2B.

Since additional channels are granted only to a mature repeater system, there will typically be hundreds of transceivers already in the field that are programmed to operate only on the system's initially allocated frequencies (i.e., the frequencies being used before new channels are allocated to the system). FIG. 2B shows one such exemplary transceiver 152 storing a frequency allocation table which does not define three additional channels 11-13 added to the system after the transceiver was installed. While it would be highly desirable to reprogram transceiver 152 (and all of the other transceivers installed prior to the addition of the new channels) with the new frequencies, reprogramming all existing transceivers is a huge task that is generally too costly and time consuming to be considered. Typically, transceivers placed into the field after the new channels have been allocated are programmed with the new channels, but all transceivers in use before the new allocation (e.g., transceiver 152 shown) continue to be capable of operating on only the initially allocated channels. Suppose a call is issued to transceiver 152 and to all other transceivers in its group to move to a new channel (e.g., channel 13) as a working channel. Transceiver 152 does not have an entry in its stored frequency allocation table corresponding to new logical channel 13, and is therefore incapable of retuning to this new channel. The result is that transceiver 152 is incapable of participating in a call intended for it, and the user issuing the call must try again (and hope one of the originally allocated channels will be free and assigned for use as the working channel).

One possible solution to this problem would be to keep track of which groups contain any transceivers put into the field before the new channels were installed and inhibit the new channels from being assigned as working channels for such groups. This situation, however, can lead to severe under-utilization of the new channels—at the same time that the initially allocated channels are being heavily loaded or over-loaded. Moreover, keeping track of which groups can operate on the new channels and which groups cannot is a rather time consuming task which wastes other system resources as well (e.g., site controller storage and processing time resources).

Needless to say, the inflexibility resulting from pre-programmed fixed frequency allocation tables stored in "personality PROMs" within individual radio transceivers arises in other situations as well (e.g., when transceivers from one system must be used with proper authorization on another system, when two existing mature systems are to be combined into a single system, and the like).

The concept of downloading information into radio transceivers via RF signals in a trunked radio system is generally known. For example, "dynamic regrouping" allows a system operator to program customized group identifications into radio transceivers in the field from the central system facility at will—and dynamically form special groups for special purposes. Motorola, Inc. of Shaumburg, Ill. has developed a so-called "SMARTNET" trunked radio communications system which offers a limited dynamic regrouping capability. The optional dynamic regrouping capability provided in this 800 MHz trunked system allows the dispatcher to reassign radios into new talk groups without any mobile operator involvement to provide communications flexibility during emergency situations. Motorola's subscriber dynamic regrouping communications system is described in WO PCT Patent Publication No. 8701537 published 12 March 1987 entitled "Method For Dynamically Regrouping Subscribers On A Communications System", and in press releases dated Aug. 6, 1987 and June 27, 1986.

Briefly, the Motorola scheme provides for downloading a single dynamic reprogramming instruction to specified individual radio transceivers in the field via digital messages transmitted over the RF control channel to each of the transceivers individually. Upon receipt of the reprogramming message, the individual transceivers acknowledge the message, store the downloaded dynamic regroup identifier in an internal memory, and switch to a dynamic regroup mode in which they transmit and receive using the dynamic group instead of their old group(s). In another mode, a "group" dynamic regroup message is transmitted to an entire group of transceivers at a time in order to increase regrouping speed. The receiving transceivers begin using an alternate, fixed "dynamic code" previously programmed at time of manufacture and/or "personality PROM" programming. The units continue to use this "dynamic code" until dynamic regrouping messages cease being periodically transmitted over the control channel.

The following issued U.S. Patents may also be generally relevant to the concept of dynamically reprogramming radio transceivers via over-the-air control messages:
U.S. Pat. No. 4,594,591 to Burke
U.S. Pat. No. 4,517,561 to Burke et al
U.S. Pat. No. 4,152,647 to Gladden et al
U.S. Pat. No. 4,612,415 to Zdunek et al
U.S. Pat. No. 4,427,980 to Fennel et al
U.S. Pat. No. 4,553,262 to Coe In addition, AmeriCom Corporation of Atlanta, Ga. has advertised an RF communications system featuring "over the air reprogramming to add channels and reprogram mobiles without expensive PROM changes." AmeriCom claims a "customer radio data base management feature" which provides "more responsive service by dynamically reprogramming mobiles from the terminal" in order to lower service costs and permits real time "over-the-air reprogramming of radio configurations and permissions." These features are described in various advertisements and specifications published by AmeriCom, including various product profile brochures dated Jan. 26, 1988 entitled "AmeriCom's Network Switch" and "AmeriCom's Network Supervisor."

Commonly assigned copending application Ser. No. 07/229,814 Childress et al filed Aug. 8, 1988 entitled "Dynamic Regrouping In A Trunked Radio Communications System" describes a technique for dynamically regrouping transceivers via RF messages.

The following additional prior issued U.S. patents may also be generally relevant:
U.S. Pat. No. 4,457,018 to Takayama (1984)
U.S. Pat. No. 4,573,206 to Grauel et al (1986)
U.S. Pat. No. 4,573,209 to Deman et al (1986)
U.S. Pat. No. 4,644,347 to Lucas et al (1987)
U.S. Pat. No. 4,677,653 to Weiner et al (1987)
U.S. Pat. No. 4,734,928 to Weiner et al (1988)

The Lucas '347 patent discloses an arrangement in which commands transmitted to a pager cause it to alternately monitor different preprogrammed local channels—thereby permitting the pager to be used in different cities. The Grauel '206 patent discloses an ability to dynamically change the number of transceivers monitoring different control channels in a multiple control channel system.

The present invention provides an improved trunked RF communications arrangement which dynamically "expands" or extends the frequency allocation table stored within the "personality" defining non-volatile storage devices of all transceivers to include additional RF channels. In the preferred embodiment, a special channel configuration control message is periodically transmitted over the active RF control channel. This channel configuration message specifies a logical channel field and an FCC channel number which exactly defines the RF frequency of the logical channel being dynamically allocated. All transceivers which correctly receive this channel configuration message extend their stored frequency allocation tables to add the additional channel entry specified by the message. FIG. 3 shows an exemplary system configuration in which a transceiver 152 has received three such channel configuration messages corresponding to three additional channels 11-13 and has added three corresponding new records to its stored frequency allocation table. The transceiver 152 references these additional records in response to call messages specifying new channels, and is thus capable of operating on the new channels.

In accordance with yet another feature of the present invention, no acknowledgements from individual transceivers are sent or required for dynamic reprogramming. Instead, all channel configuration messages are periodically repeated at relatively short intervals (e.g., a channel configuration message is transmitted every ten seconds, with the frequency of retransmission of a given channel configuration message depending upon the number of channels supported by the communications system in the preferred embodiment). The intervals are long enough to ensure the messages have no real adverse impact on control channel loading, but short enough to ensure that any transceiver which receives and stores incorrect information or has "older" programming will soon correct/update its frequency allocation table by overwriting it with correct information.

In addition, errors are prevented from occurring by transmitting the channel configuration message in both slots of an outbound control channel message, so that the mobile transceivers receive two (supposedly identical) messages virtually simultaneously. Any mobile transceiver which receives different channel configuration message data in the same two-slot message assumes one or both versions of the received message are erroneous and ignores both versions of the message. Transceivers are further prevented from adding invalid channels to their frequency allocation tables by requiring receipt of a non-zero site identification control message before processing any channel configuration message.

These as well as other features and advantages of this invention will be more completely understood and appreciated by carefully studying the following detailed description of the presently preferred exemplary embodiment taken in conjunction with the accompanying drawings, of which:

FIG. 1 is a schematic diagram of simplified exemplary user groupings in a typical trunked radio repeater system;

FIGS. 2(A) and 2(B) are schematic diagrams of an exemplary prior art mature trunked communications system configuration before and after additional RF channels are added;

Figure 8:
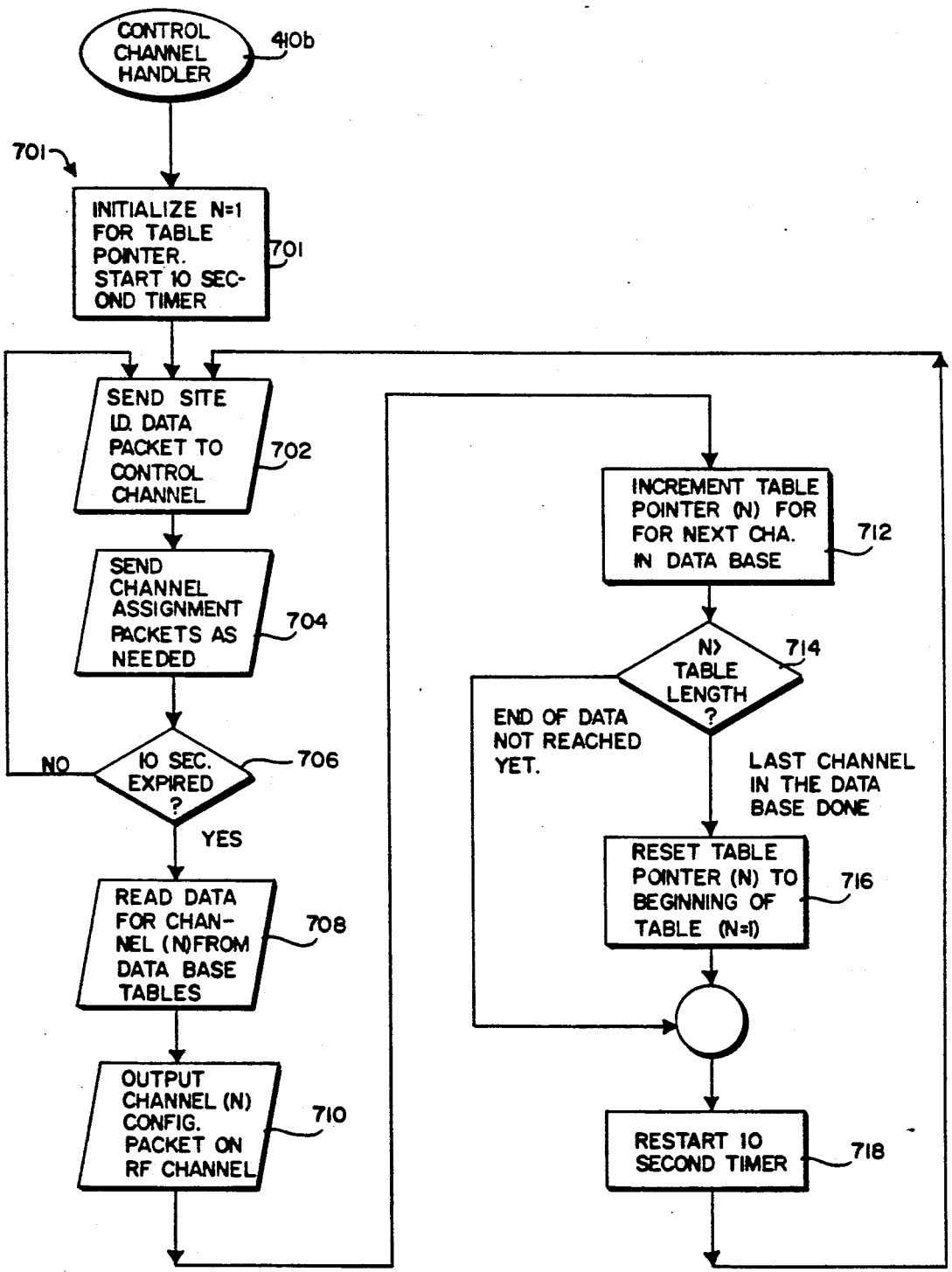
Figure 9:
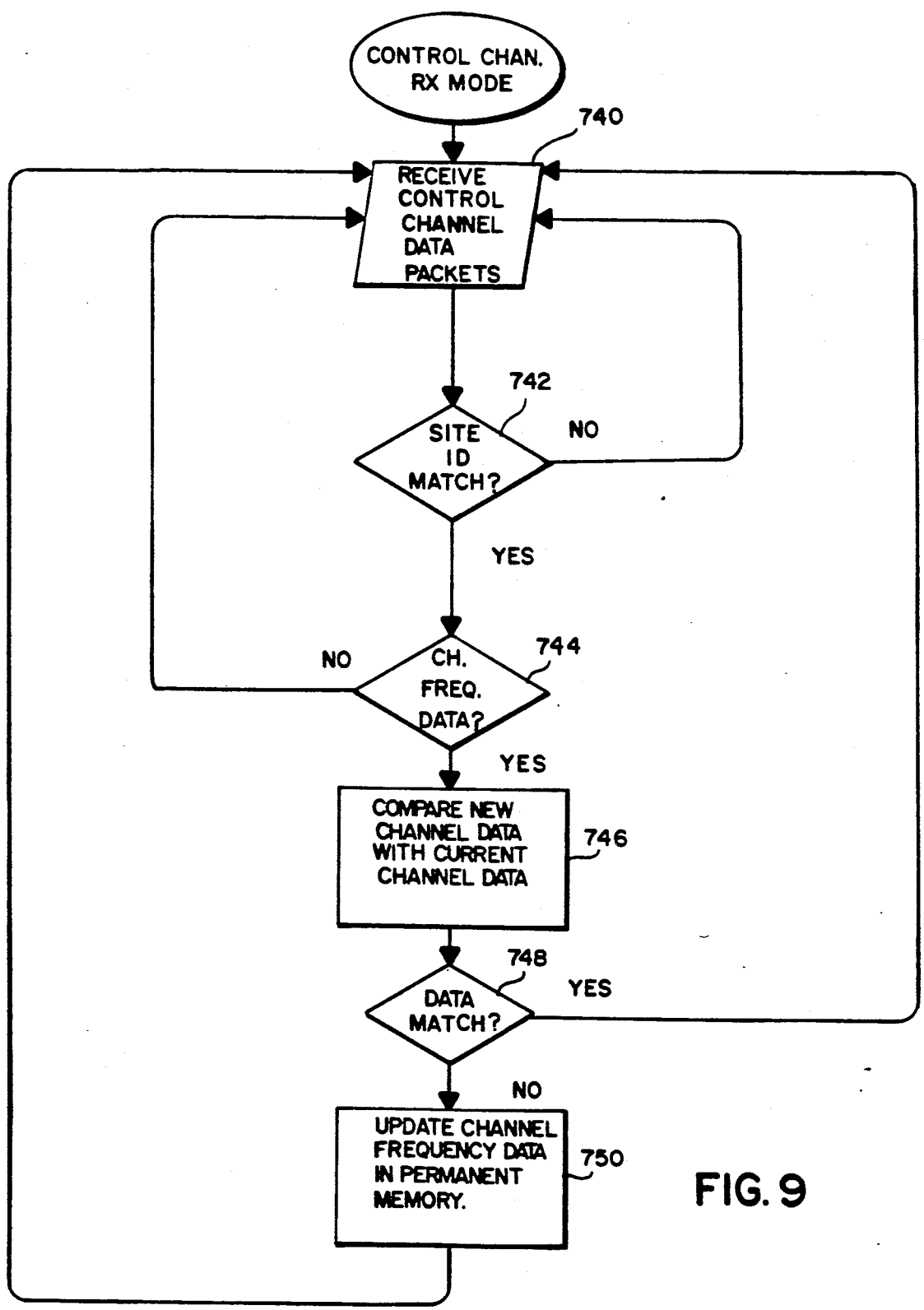

FIG. 8 is a flowchart of exemplary program control steps performed by site controller 410 in the preferred embodiment to implement the dynamic channel allocation features provided by the present invention; and FIG. 9 is a flowchart of exemplary program steps performed by mobile transceivers 152 in the preferred embodiment to implement the dynamic channel allocation features provided by the present invention.

DETAILED DESCRIPTION OF PRESENTLY PREFERRED EXEMPLARY EMBODIMENTS

Figure 4:
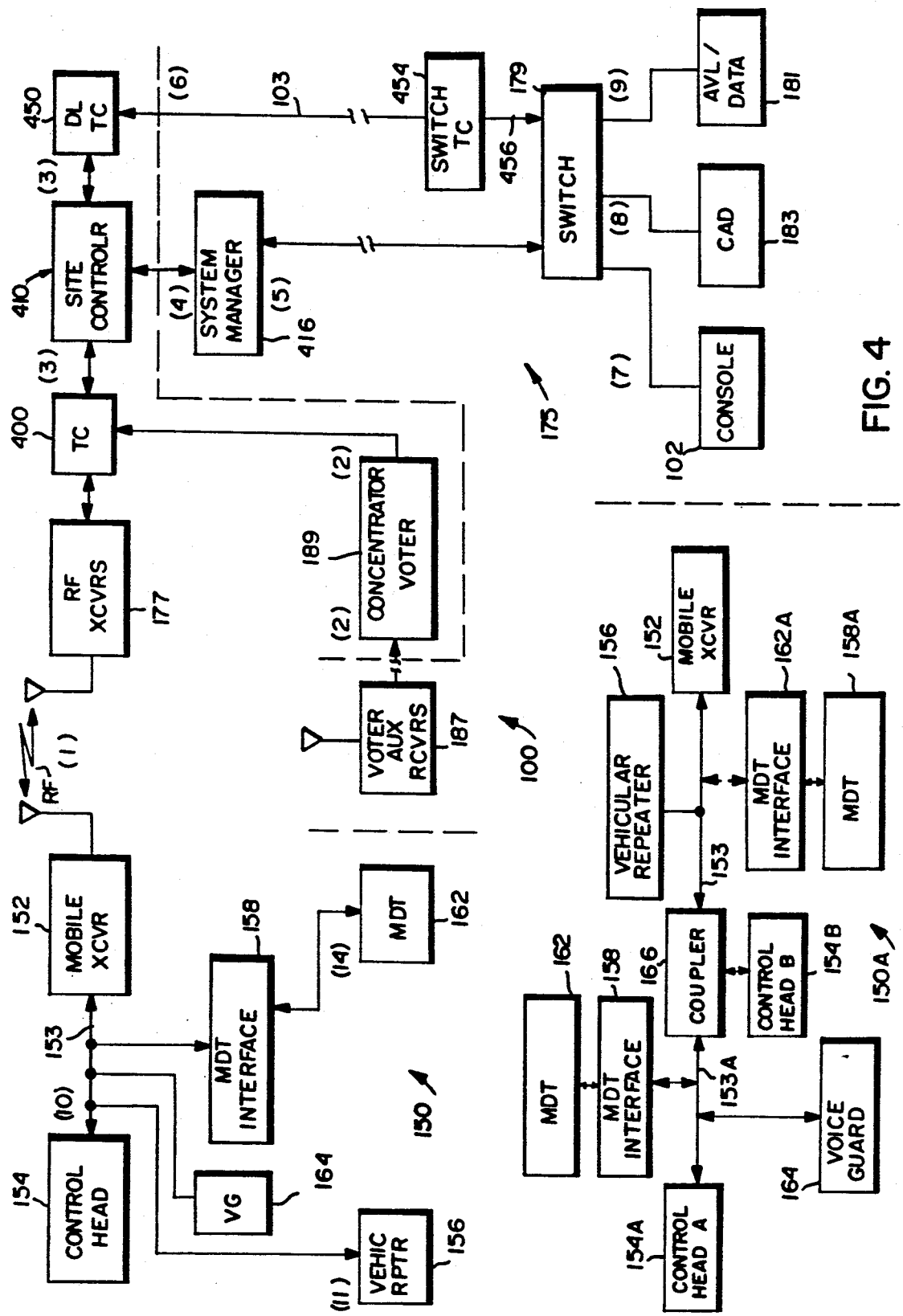
FIG. 4 is an overall block diagram of a digitally trunked radio repeater system with dynamic channel allocation capability in accordance with the presently preferred exemplary embodiment of the present invention.

An exemplary trunked radio repeater system 100 in accordance with this invention is generally depicted in FIG. 4. System 100 includes at least one (and typically many) mobile (or portable) radio transceiving stations 150 and at least one (and typically many) RF repeater stations 175. Mobile transceiving station 150 communicates via an RF link and repeater station 175 with other mobile transceiving stations and/or with landbased parties connected to the repeater station by conventional dial-up landlines.

Repeater station 175 includes a site controller 410, individual repeater channel transceivers 177, and a multiplexing telephone interconnection network ("switch", or "MTX") 179. Site controller 410 is preferably a main frame digital computer which oversees the general operation of repeater station 175. In particular, site controller 410 controls the operation of RF repeating transceivers 177 by transmitting digital signals to and receiving digital from "trunking cards" ("TC") 400 connected between the site controller and individual transceivers (although only one transceiver 177 and one trunking card 400 are shown in FIG. 4, there typically are many such trunking card/transceiver combinations in repeater station 175—one for each RF channel the repeater station operates on).

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager computer system 416 (hereafter referred to as the "system manager") is connected to site controller 410 and to switch 179 to allow a system manager to oversee and control the overall operation of system 100—and to control the dynamic channel expansion process.

An RF link ("RF") connects RF repeater transceivers 177 with mobile transceiving stations 150. Mobile station 150 is capable of transmitting analog modulated voice signals or digital data signals to and receiving such signals from repeater station 175 over the RF link.

Figure 3:
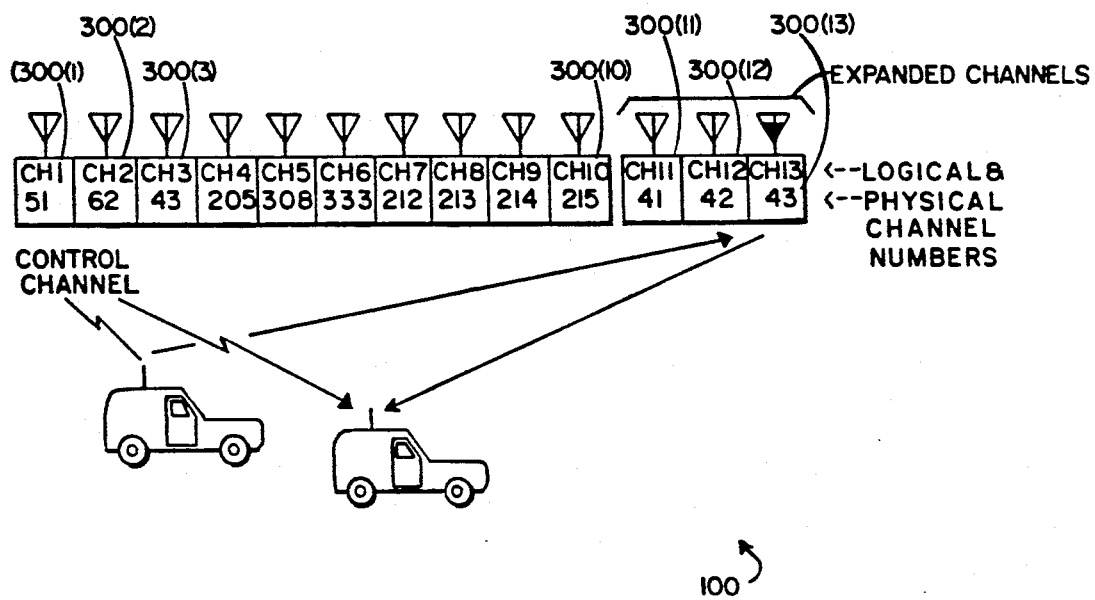
FIG. 3 is a schematic diagram showing an exemplary mature trunked communications system provided by the presently preferred exemplary embodiment of this invention.
Figure 3:
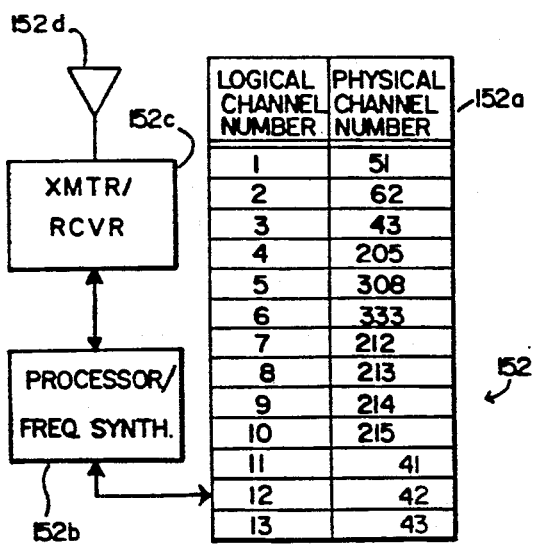

In the configuration shown in the upper left-hand portion of FIG. 4, mobile station 150 includes a mobile RF transceiver 152 connected to a control head 154 via a serial digital bus 153. Mobile transceiver 152 may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm. Mobile transceiver 152 includes a preprogrammed non-volatile memory 152a (see FIG. 3), a volatile memory, a microprocessor 152b capable of accessing both memories (the volatile memory may be part of the microprocessor if desired), a conventional frequency synthesizer (which may be a part of processor 152b or may be a separate module), and conventional RF transmit/receive circuitry 152c—all as is well known to those of ordinary skill in this art.

In the alternate mobile radio configuration shown in the lower left-hand corner of FIG. 4, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired. Systems manager 416 is capable of specifying new RF channels to be dynamically activated on command, as will be explained shortly.

Central Site Architecture

Figure 5:
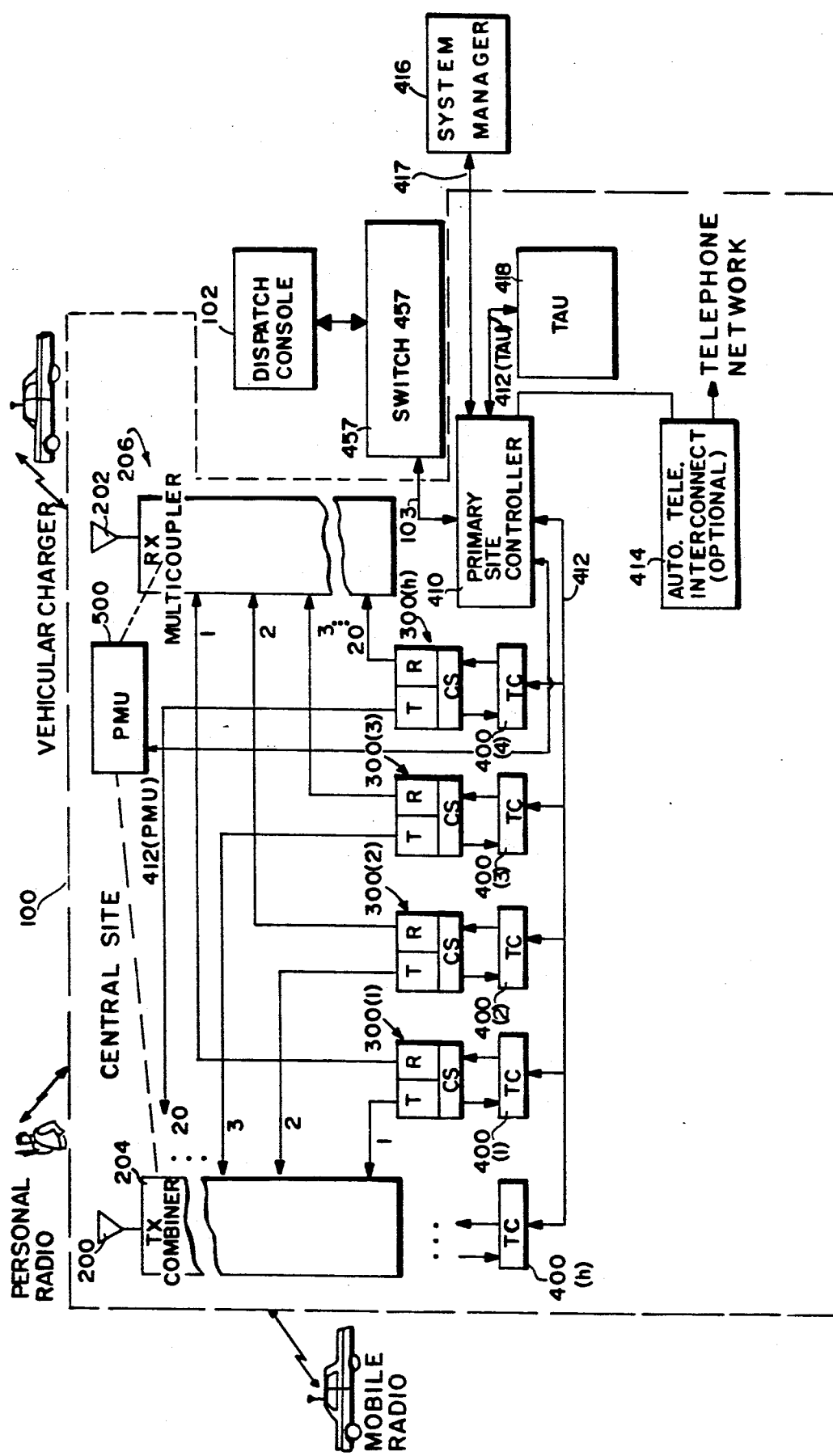
FIG. 5 is more detailed schematic block diagram of the repeater site architecture shown in FIG. 2.

Briefly, referring now more particularly to FIG. 5 (a block diagram of a single repeater site of which typical systems may have more than one), a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200–206 thus individually services a plurality of duplex RF channel transmit/receive circuits included in a plurality of RF repeater "stations" 300(1), 300(2), 300(3), 300(4), etc. Typically, there may be 24 such stations. Each station transmitter and receiver circuitry is typically controlled by a dedicated control shelf CS (e.g., a microprocessor-based control circuit). Such control shelf logic circuits associated with each station are, in turn, controlled by "trunking cards" TC (e.g., further microprocessor-based logic control circuits) 400(1), 400(2), 400(3), 400(4), etc.

Trunking cards 400 communicate with one another and/or with a primary site controller 410 via control data links 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions are incorporated within the trunking cards 400 so as to provide continued trunked repeater service even in the event that controller 410 malfunctions or is otherwise taken out of service.

An optional telephone interconnect 414 may also be provided to the public switched telephone network. A system manager 416 is also provided for overall system management and control (together with one or more dispatcher consoles 102).

A power monitoring unit (PMU) 500 allows site controller 410 to monitor the actual RF parameters associated with repeater system 100. A test, alarm and control unit (TAU) 418 is provided for detecting and diagnosing error conditions.

The RF signalling protocols and formats used in the preferred embodiment are described in detail in copending commonly assigned application Ser. No. 181,441 filed Apr. 14, 1988 entitled "Trunked Radio Repeater System", the entire disclosure of which is incorporated herein by reference as if expressly set forth herein.

Briefly, all inactive radio transceivers monitor a digital RF control channel for messages which identify groups the transceivers are members of. To establish communications between a mobile transceiver and other transceivers within its group, the mobile transceiver transmits a channel request message over the control channel. In response, the site transmits a channel assignment message directed to the transceiver group—this assignment message specifying a free working channel in terms of the working channel logical identification. All of the transceivers in the group react to this channel assignment message by referencing their internally stored frequency allocation tables to determine the transmit and receive operating frequencies corresponding to the received logical channel number, and controlling their frequency synthesizers to retune to the referenced working channel frequencies. Voice and/or data communications are permitted between the transceivers in the group over the working channel after various handshaking signalling has been exchanged.

System manager 416 plays an important role in controlling system 100 and is the portion of the communication system in the preferred embodiment which directs dynamic channel allocation functions. System manager 416 also handles all of the alarm and control functions provided by ACU 600, and also receives notification of alarm and other error conditions generated by test unit 700 and power monitor unit 500. System manager 416 in the preferred embodiment is intended to be operated by the system manager operators—people who are responsible for the overall operation and maintenance of system 100.

Figure 6:
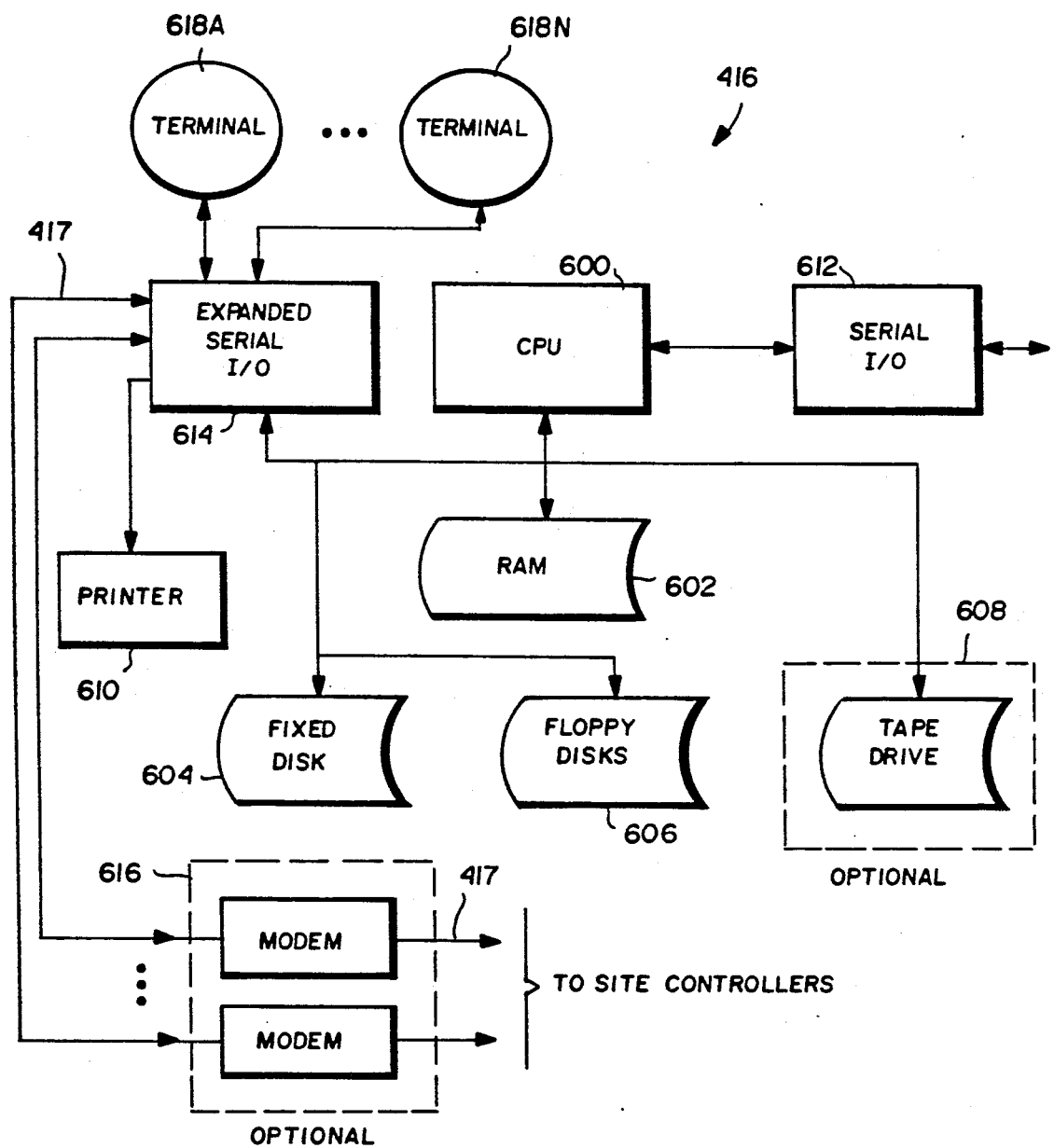
FIG. 6 is a detailed schematic block diagram of the system manager 416 shown in FIGS. 2 and 3.

FIG. 6 is a detailed schematic diagram of the structure of system manager 416. System manager 416 includes a central processing unit 600, a random access memory 602, a fixed disk 604, floppy disk drives 606, an optional tape drive 608, a printer 610, a serial I/O interface 612, an expanded serial I/O interface 614, serial modems 616, and one or more display terminals 618. Central processing unit 600 may be any desired conventional general purpose digital computer in the preferred embodiment (e.g., an IBM PC) connected to which is random access memory device 602, serial I/O interface 612, tape drive 608, fixed disk 604 and floppy disk drive 606. In the preferred embodiment, site controller 410 includes no hard disk drive, so that one of the responsibilities of system manager 416 is to store system parameters on fixed disk 604 and download those parameters to site controller 410 upon power-up of system 100 (and any time those parameters change).

CPU 600 communicates simultaneously with one or more display terminals 618 (each including the CRT display and a keyboard) via expanded serial I/O interface 614 (of conventional design). Printer 610 is provided to permit printing of a running log (or other desired reports) of system events. CPU 600 communicates with site controller 410 via a serial data link 417 (and communicates with a backup site controller via an additional serial data link). System manager 416 in the preferred embodiment is capable of managing plural sites simultaneously, and thus may be in contact simultaneously with several repeater sites. Modems 616 (of conventional design) may be provided to allow communication between the site controller 410 and system manager 416 over a conventional landline.

Figure 1:
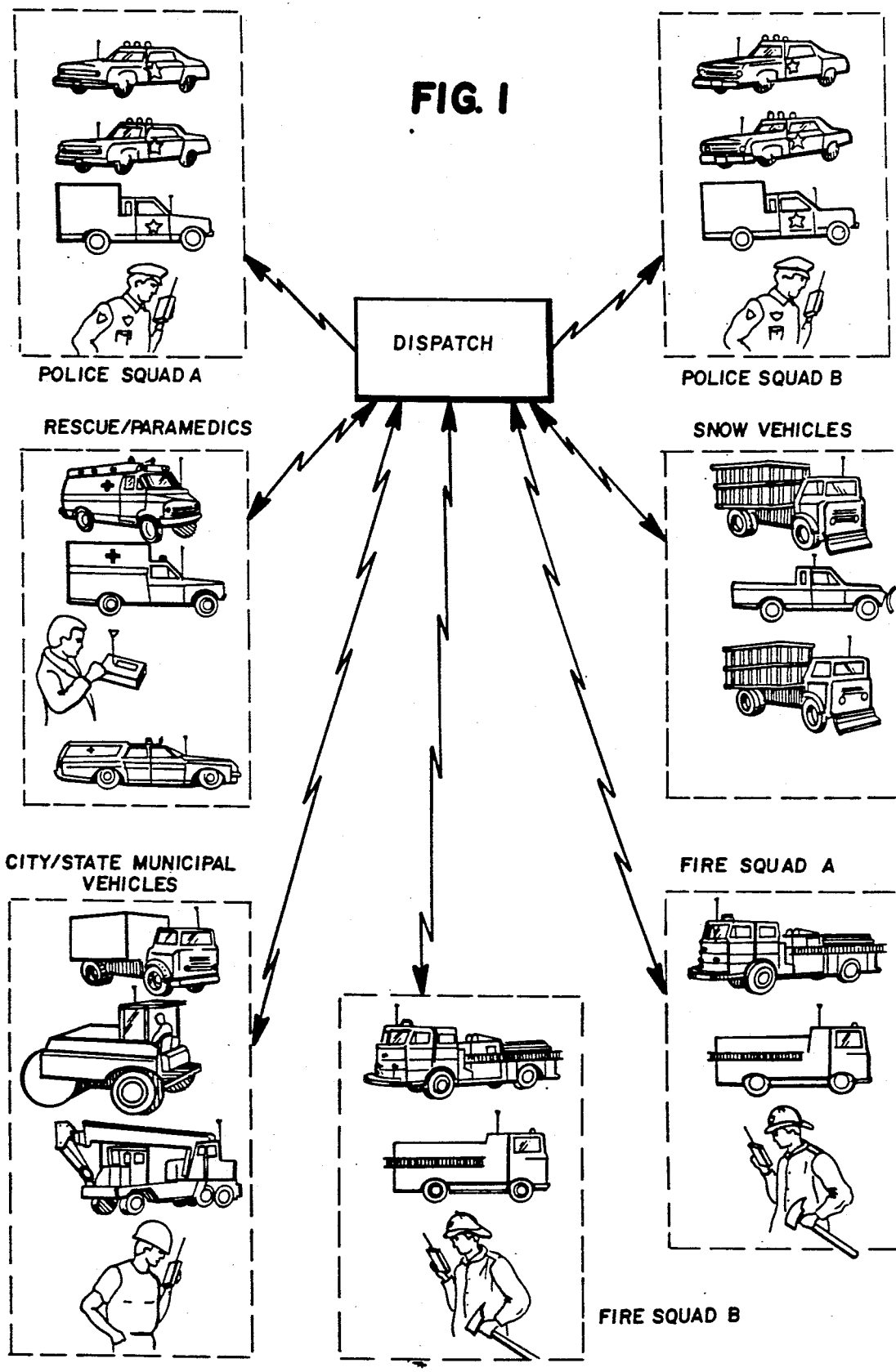
Figure 2A:
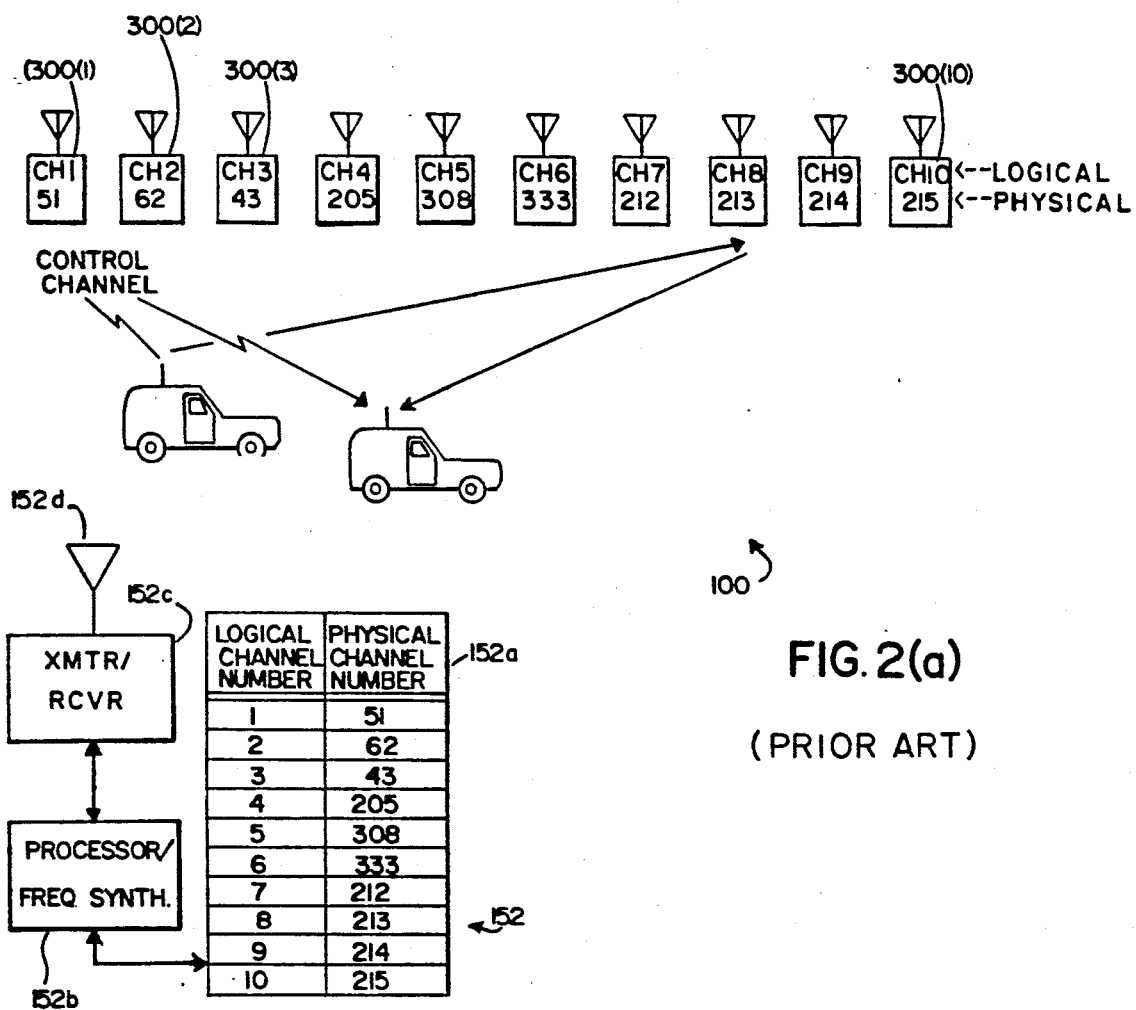
Figure 2B:
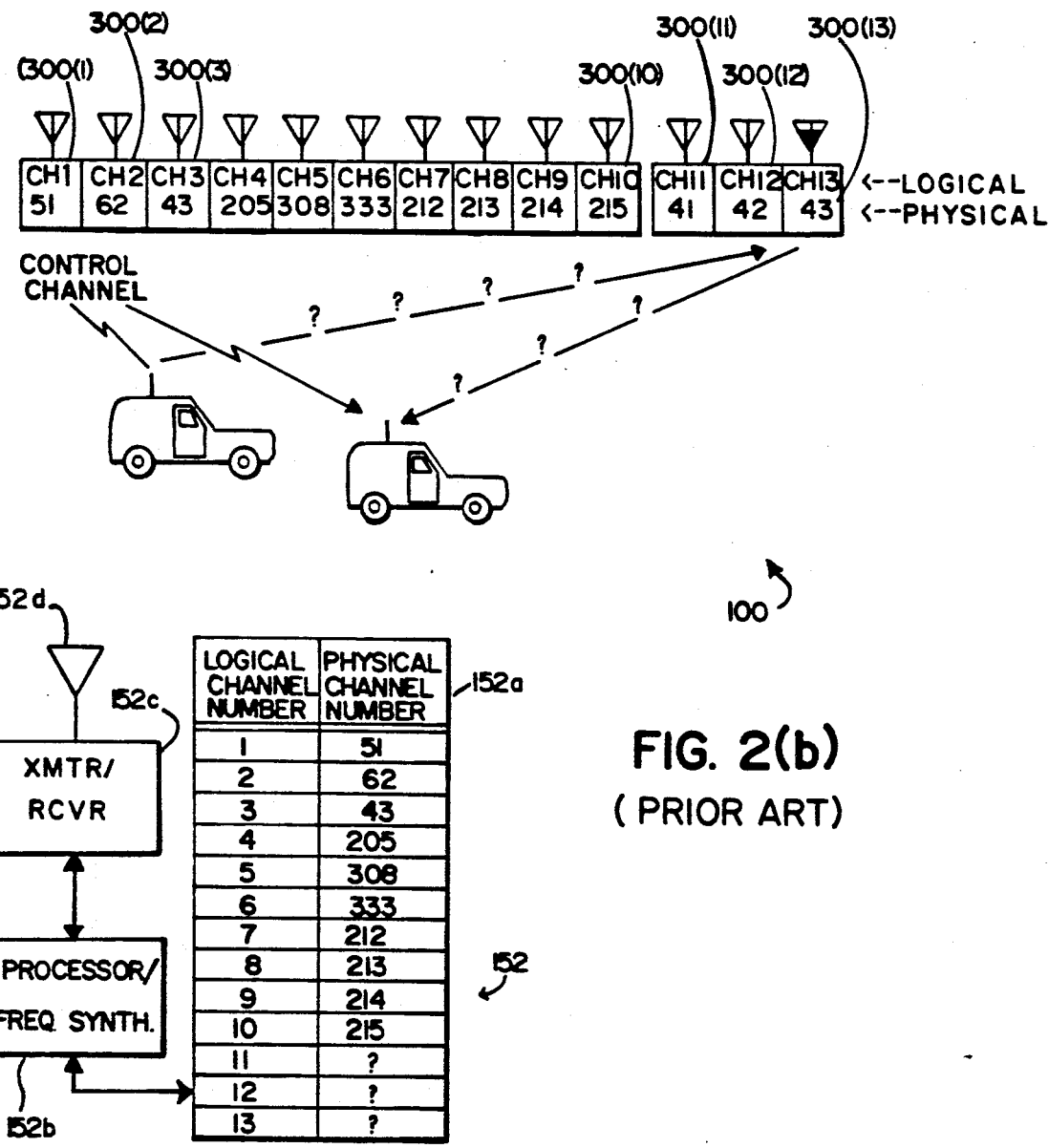
Figure 7:
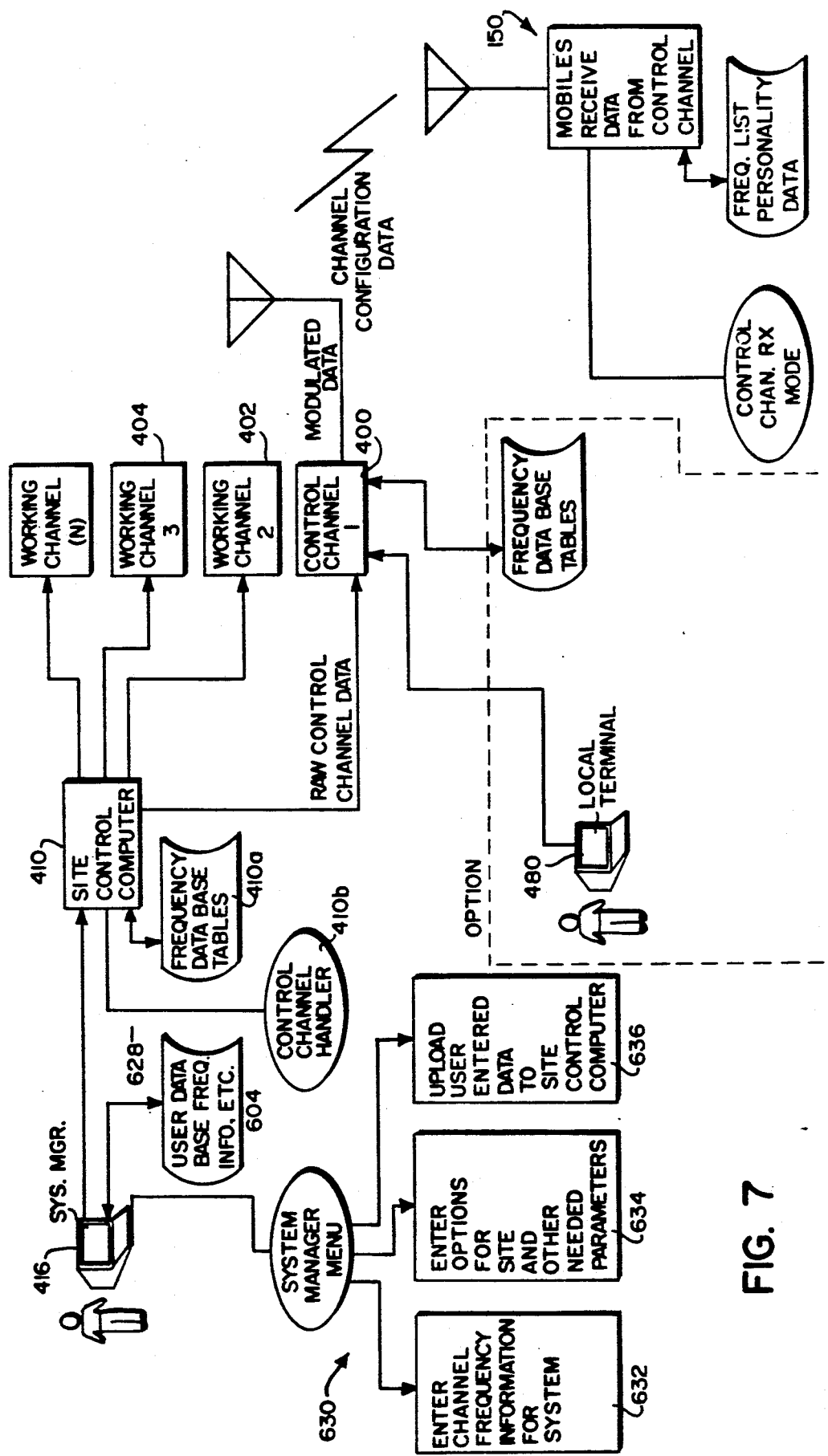
FIG. 7 is a simplified version of the block diagrams shown in FIGS. 4 and 5 also schematically showing exemplary program control steps performed by the preferred embodiment in accordance with the present invention.

FIG. 7 is a schematic diagram of the portions of site 100 and mobile transceiver 152 involved in the preferred embodiment in channel expansion, and also shows the flow and places of residence of important information used to perform the channel expansion function. System manager 416 originates commands to activate new channels via channel expansion. System manager 416 stores on its fixed disk 604 one or more databases containing user information, frequency information, site configurations, and the like. One of the databases stored on fixed disk 604 is a channel database 628 specifying, for each site of the communications system, the number of repeater transceivers installed at the site, the logical channel number used by the site to designate the corresponding RF channels, and the FCC channel numbers (i.e., actual frequencies) of the channels (a database 628 may be provided for each site if desired). This database 628 thus contains the same information stored in each mobile transceiver storage device 152a shown in FIGS. 2(a)-2(b), but may contain other information as well (e.g., an indication of which channel is the current control channel, which channels are currently active, which repeaters are currently out of service, and the like).

System manager 416 also stores executable program control instructions on fixed disk 604. Some of these instructions in the preferred embodiment comprise a menu driven user interface (shown generally in FIG. 7 at 630) which allows a user to update the database 628 with additional (or different) logical and corresponding frequency channel identifications. Suppose, for example, that a new channel is to be added to a certain site and that the repeater station and trunking card 300, 400 for this new channel are already in place. To activate the new channel, the system manager database 628 is updated by entering the new channel frequency (i.e., FCC channel number) information (at block 632). The system manager 416 may automatically assign a logical channel number to this new channel as the next sequential channel available at the site (this logical channel number is the one displayed by transceiver displays, and is also used in group call messages and the like). Additional options and parameters for the site may also be specified at this time (block 634).

A command may then be given to upload the updated database 628 to the corresponding site (block 636). This uploading operation is performed by transmitting to site controller 410, via modems 616, the entire new database in the preferred embodiment (that is, no attempt is made to update the corresponding old site controller database, but rather, an entire new database is uploaded to replace it). The database 628 is uploaded to the site controller 410 using the following message conventions and formats:

Message Protocol

Messages are transmitted between system manager 416 and site controller 410 in 8-bit data packets delimited by frame start characters and checksum characters. Each packet starts with a frame byte character of OAA hex. The internal structure of a packet is as follows:

ff tt dd dd dd . . . dd cc where
ff is the frame sync character (OAA hex),
tt is the message type byte (which defines the content of the message),
dd are data bytes, and
cc is a checksum (formed by taking the exclusive OR of each byte in the message, starting with the message ID byte, and then negating the result).

Acknowledgement Rules

Any valid message received is acknowledged. A valid message is defined as one in which the checksum of the data bytes matches the checksum transmitted. If a packet is received but has an invalid checksum, a negative acknowledgement (NACK) is sent.

Messages are transmitted singly threaded, waiting for an acknowledgement before sending the next message. Receiving a negative acknowledgement results in immediate retransmission of the packet. If an acknowledgement is not received within two seconds, the same message is retransmitted. Retransmission should occur three times before erroring out.

An acknowledgement message has the following form:

| | |
|---|---|
| ff | AA |
| tt | φφ |
| cc | FF (checksum of φφ) |

A negative acknowledgement message has the following form:

| ff | AA |
|----|----|
| tt | FF |
| cc | φφ |

Site controller 410 receives the updated database information and stores it in internal memory in the form of a frequency database table 410a. Site controller 410 uses this table 410a to control the operating frequencies of trunking card/repeater stations 300/400, and also to determine what and how many channel configuration messages need to be sent—as will be explained in conjunction with FIG. 8 (a schematic diagram of exemplary program control steps contained in a control channel handler routine 410b performed by site controller 410 in the preferred embodiment).

The exemplary steps 700 shown in FIG. 8 are only the subset of steps in the control channel handler routine 410b relevant to the channel expansion feature of the preferred embodiment. As will be understood by those skilled in the art, many other steps may be performed by site controller 410 to manage and control the control channel. The steps 700 shown in FIG. 8 may be interrupt driven based on a ten-second timer if desired.

Routine 410b first initializes a table pointer N to point into the first entry of frequency allocation table 410a and starts a ten-second timer running (block 701). In the preferred embodiment, "channel configuration" messages are transmitted for all channels of a site—even ones that existed when the "oldest" mobile transceiver was installed. This arrangement permits maximum flexibility, since even existing channels can be changed if desired. In an alternate embodiment, channel configuration messages are transmitted only for those channels that are not a part of the "minimal" channel configuration stored in all mobile transceiver memories 152a (e.g., messages are generated only for channels not guaranteed to be permanently stored in the "personality PROMs" of all transceivers).

Routine 410b then sends a site ID data packet to the control channel trunking card 400(1) to generate an outgoing site ID message on the control channel. The following is an exemplary format for this site ID message in the preferred embodiment:

```
            SITE ID
FORMAT: 27......................0
        111                     [MT-A]
          111                   [MT-B]
            010dd               [MT-C]
                 ccccc          [Channel]
                      ppp       [Priority]
                         h      [Home Site]
                          ff    [Failsoft]
                            sssss [Site ID]
```

This site ID message informs units of the configuration of each of the various sites in the system. Since mobile transceivers 152 are free to travel between sites, transceivers often "lose" the control channel of a site they are travelling out of and must find and begin monitoring the control channel of a different site. The Site ID message informs the mobile transceiver of which site it is monitoring the control channel of and also informs transceivers about the control channels of adjacent sites. The Home Site bit notifies transceivers if the site described in the message is the same site that is transmitting the message (since a site can issue a Site ID message describing the configuration of an adjacent site in the preferred embodiment). The Site ID field is the site number of the site itself (h=0) or an adjacent site (h=1). The channel field specifies in terms of logical channel number which channel of the site is the current control channel.

In the preferred embodiment, the Site ID message is also used to index the frequency allocation table stored by a receiving mobile transceiver. In the preferred embodiment, a site may transmit "channel configuration" messages corresponding only to its own configuration—and a transceiver 152 requires receipt of a valid nonzero Site ID message specifying the originator as a "home site" before it will dynamically expand its frequency allocation table in response to a later received "channel configuration" control channel message.

In the preferred embodiment, any site which begins operating in the "fail soft" mode transmits Site Id messages with a "site id" field set to zero. Any transceiver 152 receiving a Site Id message with "site id"=0 inhibits itself from processing channel configuration messages. Thus, in the failsoft mode, the communications system fully supports all RF channels previously added by RF channel expansion but is not capable of adding additional RF channels. If desired, however, information stored by each trunking card 400 could be extended to include channel frequency information in addition to logical channel number—permitting the control channel trunking card to generate channel configuration messages without support from site controller 410. In such instance, a portable terminal 480 (see FIG. 7) local to the site could be used to directly update the memory of control channel trunking card 400 for augmenting the frequency allocation table it stores. The control channel trunking card may then use this updated table for assigning working channels and for periodically generating channel configuration messages.

Referring now to FIG. 9 (a schematic flowchart of exemplary program control steps performed by mobile transceiver 152 in the preferred embodiment), a mobile transceiver receiving a control channel data packet (block 740) parses the incoming packet and determines for a received Site ID message whether the Site Id field matches the Site ID of one of the frequency allocation tables stored in its memory 152a. If there is no match (decision block 742 "No" branch), the message is ignored. If there is a match (decision block 742 "Yes" branch), the transceiver is enabled to expand its frequency allocation table by adding new channel entries in response to an outbound control channel "channel configuration" message sent by site controller 410 over the control channel.

Referring once again to FIG. 8, site controller 410 may originate channel assignment messages as needed over the outbound control channel (block 704) and send other routine messages over the control and working channels. When the ten-second timer expires (tested for by decision block 706), the frequency allocation table record pointed to by the N pointer is read (block 708) and an outbound control channel "channel configuration" message is generated and sent, this message containing the channel information read from the record (block 710). An exemplary message format for this "channel configuration" control channel message appears below:

OUTBOUND CONTROL CHANNEL MESSAGE
CHANNEL CONFIGURATION

```
MESSAGE #1
FORMAT:  27......................0
         111                       MT-A
             111                   MT-B
                00011              MT-D
                    ccccc          Logical Channel No.
                       fffffffffff FCC Frequency MESSAGE #2
FORMAT:  (Identical to Message #1 Format)
``` where "ccccc" is a five-bit field defining (in binary) the logical channel used in channel assignments, and "fffffffffff" is an eleven-bit field specifying (also in binary) the FCC channel number which exactly defines the RF frequency of the logical channel being dynamically allocated. The message occupies both outbound control channel message slots, with the same information being inserted into both slots. This message defines logical channel number relative to the physical channel number of a specific site.

Referring again to FIG. 9, a transceiver 152 enabled by a previously received Site ID message which receives a "channel configuration" message (tested for by decision block 744) first performs some preliminary error checking steps to assure the received frequency data information is correct. In the preferred embodiment, various techniques are used to ensure that a transceiver 152 never receives and acts on erroneous channel expansion data. The outbound control channel consists of frames of data including bit and word synchronization information followed by two messages. Each message is 28 bits long with a 12-bit BCH error correction code attached. In the preferred embodiment, each message is transmitted three times—first uninverted, then inverted, then uninverted. Because the channel configuration message is transmitted in both message slots, a receiving transceiver 152 actually receives the same logical channel number and FCC channel number information a total of six times. The transceiver analyzes each message slot independently using the appended BCH error checking codes and a voting technique designed to eliminate errors (all in a well known manner). The transceiver 152 then compares the results of the two message slot decodes to ensure they are identical. If the results are not identical, the transceiver ignores the message and returns to parsing control channel messages (block 740). On the other hand, if valid channel expansion information is received, the transceiver 152 updates the frequency allocation table it stores in its memory device 152a at blocks 746-748—as will be explained shortly.

Referring once again to FIG. 8, after a channel configuration message is transmitted the site controller 410 increments its pointer N to the "next" record of its frequency allocation table (block 712) and determines whether the end of table has been reached (block 714). If the end of table has been reached, pointer N is set to the "first" record in the table so that an earlier transmitted channel configuration message will be repeated (block 716). The ten second timer is then restarted (block 718) to time another ten-second interval.

In the preferred embodiment, only one channel configuration message is transmitted every ten seconds. Thus, a channel configuration message specifying a particular channel is transmitted periodically in the preferred embodiment at intervals having a minimal duration of ten seconds and a maximum duration which depends on the number of channels being specified by channel configuration messages. For example, it takes approximately ten seconds×20=200 seconds to specify all channels in a 20 channel system via channel assignment messages.

Referring once again to FIG. 9, a transceiver 152 receiving and successfully decoding a channel configuration message to obtain reliable and correct frequency data compares the newly received data with the frequency allocation table already stored in its non-volatile memory 152a at block 746. One of three possible results may arise from this comparison: (a) there is no entry stored in the transceiver memory corresponding to the logical channel number contained in the received data; (b) a corresponding logical channel number entry is already stored, but the stored FCC channel number (i.e., frequency data) associated with the stored logical channel number differs from the received FCC channel number; and (c) a previously stored logical channel number/FCC channel number pair is identical to the received data. For case (a) (tested for by decision block 748), a new record is written into transceiver memory as an extension to the frequency allocation table already stored there (block 750). For case (b), the corresponding record stored in the memory is overwritten with the newly received information (block 750). For case (c) (the "Yes" branch of decision block 748), no further action is taken. The transceiver 152 then returns to receiving and parsing incoming control channel messages at block 740. In the preferred embodiment, transceiver 152 reserves sufficient space in its memory 152a to store a maximum number of desired channels (e.g., 20 channels even though only 10 channels may be in use initially).

In the preferred embodiment, at least one channel programmed into the memory 152a of each mobile transceiver 152 cannot be changed by the routine shown in FIG. 9. All mobile transceivers 152 retain their original programming specifying this common "backup" RF channel which they can revert to in case a catastrophic system-wide error occurs (e.g., when the system manager issues incorrect channel expansion instructions). To recover from a catastrophic system error of this type, site controller 410 can bring up a control channel on this common backup channel and issue channel configuration messages over this control channel to effect proper reprogramming. If a mobile transceiver 152 cannot locate a control channel after several minutes of scanning the channels specified in its frequency allocation table in the preferred embodiment, it begins periodically monitoring this backup channel to determine whether the channel has been brought up as a control channel.

In the preferred embodiment, transceiver memory 152a which stores the frequency allocation table is non-volatile and the entire memory is capable of being written to and read from by transceiver processor 152b. In an alternate embodiment, the transceiver includes a non-volatile read only memory programmed at the time the transceiver is installed with a frequency allocation table the transceiver is incapable of changing in response to receipt of channel configuration messages. Upon receiving a channel configuration message, transceiver 152 in this alternate embodiment may extend the frequency allocation table stored in the non-volatile memory with an additional portion of the table stored in volatile memory (e.g., in a RAM internal to the microprocessor). The portion of the table stored in the RAM may supersede the table portion stored in non-volatile memory if desired to permit preprogrammed channels to be changed dynamically. The table entries stored in the volatile memory may be lost each time the transceiver 50 is powered off, since they will be reacquired soon after the transceiver is activated once again because of the periodic transmission of channel configuration messages.

Channel assignment messages in the preferred embodiment specify a five-bit logical channel number and require a receiving transceiver to reference its internally stored frequency allocation table. Upon receiving a channel assignment message, transceiver 152 performs a "lookup" into its stored frequency allocation table to locate the record corresponding to the logical channel number field within the channel assignment message. Once a matching record is found, the transceiver reads the corresponding FCC channel number frequency data from the table and encodes/decodes this data appropriately to produce transmit and receive frequency control strings for controlling the transceiver frequency synthesizer (the transmit and receive frequencies are offset by a standard frequency offset such as 39 MHz, so only a single channel number is required to fully specify both frequencies). These control strings are loaded into the synthesizer for transmit and receive operations.

In another embodiment of the invention, a channel configuration message is periodically transmitted only with the "highest" currently assigned and active logical channel number (these numbers being assigned sequentially in ascending order to new channels). Upon receiving this message, a transceiver 152 determines whether "highest" logical channel number stored in its own frequency allocation table is equal to (or greater than) the logical channel number contained in the received message. If the already stored "highest" channel number is at least equal to the logical channel number contained in the message, nothing further is done. If the already stored channel number is not at least equal to the received channel number, the mobile transceiver may request reprogramming (e.g., by generating an inbound control channel message). The "phase I" and/or "phase II" message sequences described in copending application Ser. No. 07/229,814 for dynamic regrouping or similar such message sequences may be used to efficiently transmit new channel data to individual or groups of mobile transceivers and ensure that the data is correctly received and acted upon.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a digitally trunked RF communications system of the type providing trunking of radio frequency communications over a set of trunked RF communications channels, said system including a digital RF control channel and plural trunked RF working channels, said system further including plural digitally trunked RF transceivers initially programmed to have predefined trunked working channel frequencies and associated working channel numbers stored therein, a method of dynamically expanding the set of channels so as to permit expanded operation of said plural RF transceivers on additional trunked RF transceivers on additional trunked RF working channels not initially preprogrammed into said RF transceivers, said method comprising the steps of:
  (1) broadcasting a digital channel configuration message over said digital RF control channel simultaneously to all said plural RF transceivers, said digital channel configuration message indicating a trunked RF channel;
  (2) receiving said transmitted channel configuration message with each of said plural, digital RF transceiver;
  (3) at each of said plural transceivers, comparing the working channel specified by said received channel configuration message with said prestored channels;
  (4) at each of said plural transceivers, if said comparison reveals said working channel specified by said received message differs from said predefined working channel, dynamically storing said specified working channel within said transceivers; and
  (5) controlling each of said plural transceivers to transmit and/or receive signals over said working channel stored by said storing step (4) in response to digital trunking commands conveyed over said control channel.

2. A method as in claim 1 further including the preliminary step of preprogramming each of said plural transceivers with a set of logical and physical channel numbers corresponding to said set of trunked RF communications channels.

3. A method as in claim 2 wherein:
  said broadcasting step (1) includes transmitting a logical channel number and a corresponding channel frequency;
  said comparing step (3) includes comparing said transmitted logical channel number with said preprogrammed logical channel numbers; and
  said storing step (4) includes storing, at each of said plural transceivers, any transmitted logical channel number said comparing step reveals said transceiver is not preprogrammed with and also storing said corresponding channel frequency.

4. A method as in claim 1 further including:
  transmitting a site ID message specifying a site;
  receiving said site ID message with each of said transceivers; and
  inhibiting at least said storing step (4) until said site ID message receiving step has been performed.

5. A method as in claim 1 wherein said storing step comprises permanently storing a designation of one frequency of said working channel in a non-volatile memory device.

6. A method as in claim 1 wherein said storing step comprises temporarily storing said channel frequency in a volatile memory device.

7. A method as in claim 1 wherein said broadcasting step (1) comprises retransmitting said channel configuration message at intervals in the range of 10 seconds to ten minutes.

8. In a digitally trunked RF communications system providing message trunking over a set of RF communications channels, a method of dynamically expanding the set of channels comprising the steps of:
  (1) periodically transmitting a channel configuration message over a digital RF control channel, said channel configuration message specifying a channel frequency;

(2) receiving said transmitted channel configuration message substantially simultaneously with plural mobile/portable transceivers, said mobile/portable transceivers each having channel frequencies prestored therein;

(3) at each of said plural transceivers, comparing the channel frequency specified by said received message with at least one channel frequency prestored by said transceiver;

(4) if said comparison reveals said channel frequency specified by said received message differs from said previously stored channel frequencies, storing said specified channel frequency within said transceiver; and (5) controlling said transceiver to transmit and/or receive signals over said channel frequency stored by said storing step (4), wherein said storing step (4) includes rewriting said previously stored channel frequencies and inhibiting rewriting of at least one previously stored channel frequency.

9. In a digitally trunked RF communications system providing message trunking over a plurality of RF communications channels, an arrangement for dynamically expanding the number of said channels comprising:

means for prestoring channel frequencies corresponding to said plurality of RF communications channels;

means for periodically receiving a channel configuration message over a digital RF control channel, said channel configuration message specifying a channel frequency, and for not transmitting any acknowledgement message responsive to said received channel configuration message;

means connected to said receiving means and said storing means for comparing the channel frequency specified by said received message with channel frequencies stored by said storing means;

control means connected to said storing means for storing said specified channel frequency into said storing means if said comparison reveals said channel frequency specified by said received message differs from said previously stored channel frequencies; and RF means connected to said storing means for transmitting and/or receiving signals over any of said channel frequencies stored by said storing means.

10. An arrangement as in claim 9 wherein:

said storing means stores a logical channel number associated with each of said plurality of stored channel frequencies;

said receiving means receives a logical channel number associated with said received channel frequency;

said comparing means includes means for comparing said received logical channel number with each of said stored logical channel numbers; and said control means stores said received logical channel number and said received channel frequency into said storing means if said comparison reveals said received number/frequency pair differ from each of said stored number/frequency pairs.

11. An arrangement as in claim 9 wherein:

said receiving means includes means for receiving a site identification message and means for comparing said received site identification message with a predetermined zero site identification message; and said control means includes means for inhibiting storing of said received channel frequency unless said comparator reveals said received site identification message is different from said zero site identification message.

12. An arrangement as in claim 9 wherein said receiving means includes means for receiving and decoding redundant data specifying said channel frequency and means for discarding said redundant data if said redundant data does not exactly match.

13. An arrangement as in claim 9 wherein said RF means includes means for deriving discrete transmit and receive frequencies from said stored channel frequency.

14. A method for dynamically expanding the RF channels in a digitally trunked radio repeater system including:

receiving a channel configuration message over a digital RF control channel, said channel configuration message having the following format:

(a) a header portion comprising bit and word synchronization information, (b) a first message portion including a five-bit logical channel number field and an eleven-bit physical channel field specifying an FCC channel number, and (c) a second message portion including a five-bit logical channel number field and an eleven-bit physical channel field specifying an FCC channel number;

comparing said received first and second message portions;

if said comparison reveals said first and second message portions differ from one another, discarding both received message portions;

if said comparison reveals said first and second message portions are identical, comparing the five-bit logical channel number field and eleven-bit physical channel field of one of said first and second message portions with at least one pair of logical channel number/physical channel fields stored in a memory device; and if said further comparison reveals said received five-bit logical channel number field and eleven-bit physical channel field differ from all of said pairs stored in said memory device, storing said five-bit logical channel number field and eleven-bit physical channel field into said memory device.

15. A digitally trunked radio repeater system including:

means for receiving a channel configuration message over a digital RF control channel, said channel configuration message having the following format:

(a) a header portion comprising bit and word synchronization information, (b) a first message portion including a field pair comprising a five-bit logical channel number field and an eleven-bit physical channel field, and (c) a second message portion including a field pair comprising a five-bit logical channel number field and an eleven-bit physical channel field;

means connected to said receiving means for comparing said received first and second message portion pairs and for discarding both pairs if said comparison reveals said first and second message portion pairs differ from one another;

memory means for storing at least one field pair comprising a five-bit logical channel number field and an eleven-bit physical channel field; and control means connected to said memory means and said comparing means for further comparing a non-discarded one of said first and second message portion pairs with the field pair stored in said memory means and for storing one of said first and second message portion pairs into said memory means if said further comparison reveals said first and second message portion pairs are not identical to said pair stored in said memory means.

16. In a digitally trunked RF communications system providing message trunking over a plurality of RF communications channels, an arrangement for recovering from erroneous dynamic channel programming comprising:

means for storing channel frequencies corresponding to a plurality of dynamically programmed RF communications channels and for storing at least one further backup channel frequency incapable of being dynamically programmed;

scanning receiver means for scanning said plurality of channels to locate a control channel;

means connected to said scanning receiver means for testing whether said scanning receiver means has located a control channel;

said scanning receiver means also for monitoring said backup channel frequency if said testing reveals a control channel has not been located and for receiving channel configuration messages specifying further RF communications channel frequencies over said backup channel frequency; and means for storing said received further channel frequencies in lieu of said first-mentioned stored channel frequencies.

17. A method as in claim 1 wherein:

said broadcasting step (1) includes the step of redundantly transmitting said digital configuration message in successive slots of a dual slot outbound control channel message; and said receiving step (2) includes the steps of:

nearly simultaneously receiving said digital channel configuration message transmissions, comparing said redundant digital channel configuration messages, and ignoring each of said received channel configuration messages if said comparison fails to reveal identity between said received messages.

18. A method as in claim 1 wherein:

each said transceiver typically transmits an acknowledgement message in response to receipt of a control channel message; and said receiving step (2) includes the step of inhibiting said transmission of an acknowledgement message in response to receipt of said channel configuration message.

19. A method as in claim 1 wherein said step (4) is conditioned on receiving a non-zero site identification control message prior to said receiving step (2).

20. A method as in claim 1 wherein said transmitting step (1) includes transmitting a binary-encoded logical channel number and a binary-encoded physical channel number.

21. A method as in claim 1 further including the preliminary step of individually preprogramming each said plural RF transceivers with said set of trunked RF communications channels via a hard-wired link.

22. In a digitally trunked RF communications system of the type providing trunking of radio frequency communications over trunked RF communications channels, said system including a first repeater site capable of transmitting and receiving over a first digital RF control channel and a first set of plural trunked working channels, said first repeater site continually transmitting a first site ID message over said first digital RF control channel, said system further including plural digitally trunked RF transceiver initially preprogrammed to operate in a trunking manner on trunked RF working channels specified by a prestored first frequency allocation tables corresponding to said first repeater site, a method of operating said RF transceivers including the steps of:

(1) receiving and decoding said first site ID message conveyed over said first digital RF control channel;

(2) selecting said first prestored frequency allocation table in response to said decoded site ID message;

(3) receiving a digital channel configuration message over said first digital RF control channel, said digital channel configuration message specifying a trunked RF channel;

(4) dynamically expanding said selected frequency allocation table to include said trunked RF channel specified by said received channel configuration message without acknowledgement receipts of said digital channel configuration message; and (5) transmitting and/or receiving signals over said channel included by said dynamically expanding step (4) in response to receipt of digital trunking commands conveyed over said first digital RF control channel.

23. A method as in claim 22 wherein said receiving step (3) includes the steps of:

nearly simultaneously receiving redundant digital channel configuration message transmissions, comparing said redundant digital channel configuration messages, and ignoring each of redundant digital received channel configuration messages if said comparison fails to reveal identity between said received messages.

24. A method as in claim 22 wherein said method further includes the steps of typically transmitting an acknowledgement message in response to receipt of messages transmitted over said digital RF control channel, and said receiving step (3) includes the step of inhibiting transmission of an acknowledgement message in response to receipt for said channel configuration message.

25. A method as in claim 22 further including receiving a failsoft indicating site identification control message and inhibiting said step (4) in response to receipt of said failsoft indicating site message.

26. A method as in claim 22 wherein said receiving step (3) includes receiving a binary-encoded logical channel number and a binary-encoded physical channel number.

27. A method as in claim 22 further including the preliminary step of individually preprogramming said RF transceiver with said first and second frequency allocation tables via a hard-wired link.

28. In a digitally trunked RF communications system of the type providing trunking of radio frequency communications over RF communications channels, said system capable of transmitting and receiving over a digital RF control channel and plural trunked working channels, said system further including at least one digital RF transceiver initially preprogrammed to operate in a trunked manner on trunked RF working channels specified by a prestored frequency allocation table, said table indicating an ordered sequence of assigned channels, a method of operating said RF transceiver comprising the steps of:

(1) receiving a digital channel configuration message over said digital RF control channel, said digital channel configuration message specifying a highest assigned channel in said ordered sequence of assigned channels;

(2) determining whether the specified highest currently assigned channel is prestored in said frequency allocation table;

(3) if said determining step (2) reveals said highest channel is not prestored in said frequency allocation table, transmitting an inbound control channel message requesting reprogramming;

(4) receiving at least one reprogramming message in response to said inbound control channel message transmitted by said step (3); and (5) dynamically altering said prestored frequency allocation table to include additional trunked RF channels specified by said received reprogramming message.

29. In a digitally trunked RF communications system providing digital message trunking over a plurality of trunked RF communications channels, an arrangement for dynamically expanding the set of trunked RF communications channels used by said system so as to efficiently add to said system channels allocated to said system after a larger user base of digitally trunked radio transceivers has been installed in the field, said system including plural digitally trunked RF transceivers, each said transceiver comprising:

means for storing preprogrammed channel indicia specifying said plurality of trunked RF communication channels;

RF receiving means for receiving a channel configuration message over a digital RF control channel, said channel configuration message specifying a further trunked RF channel;

means connected to said receiving means and said storing means for comparing the further channel specified by said received message with said preprogrammed channel indicia stored by said storing means;

control means connected to said storing means for permanently writing said specified further channel into said storing means if said comparison reveals said channel specified by said received message differs from each of said preprogrammed channels;

said RF receiving means also for receiving digital trunking commands specifying said further channel reconveyed over said digital control channel; and RF transmitting means, connected to said storing means and to said receiving means, for selectively transmitting trunked RF signals over said further channel in response to said received trunking commands.

30. An arrangement as in claim 29 wherein:

said storing means stores a logical channel number/physical channel number pair associated with each of said plurality of stored channels;

said receiving means receives a logical channel number/physical channel number pair associated with said further channel; and said control means stores said received logical channel number and said received physical channel number into said storing means if said received logical channel number/physical channel number pair differs from each of said stored pairs.

31. An arrangement as in claim 30 wherein said RF means includes means for deriving transmit and receive frequencies from said stored physical channel numbers.

32. An arrangement as in claim 29 wherein:

said receiving means includes means for receiving a site identification message and for determining whether said received site identification message corresponds to a predetermined zero site identification message; and said control means includes means for inhibiting storing of said received further channel indicia unless said receiving means has determined receipt of a non-zero site identification message.

33. An arrangement as in claim 29 wherein said receiving means includes means for receiving and decoding plural messages specifying said additional channel, and means for discarding all said plural received versions if said versions are not identical to one another.

34. A method of simultaneously, dynamically expanding the set of trunked RF channels a plurality of digitally trunked RF communications transceivers operate on, said method including the following steps:

receiving substantially simultaneously, with each of said plurality of digitally trunked transceivers, a broadcasted digital channel configuration message specifying logical and physical channel numbers corresponding to a new trunked RF channel to be added to said system;

overwriting, within each of said RF communications transceivers, at least one non-volatile memory location with said received logical and physical channel numbers without acknowledging receipt of said received channel configuration message;

accessing, in each of said plural RF communications transceivers, said overwritten non-volatile memory location in response to receipt of a further digital RF trunking command specifying said overwritten logical and/or physical channel number; and controlling, within each of said RF communications transceivers, a local oscillator frequency in response to the contents of said accessed memory location.

* * * * *